(12) United States Patent
Hanchett et al.

(10) Patent No.: US 6,447,615 B2
(45) Date of Patent: *Sep. 10, 2002

(54) SAGO FLUIDITY STARCH AND USE THEREOF

(75) Inventors: Douglas J. Hanchett, Wharton, NJ (US); Tunyawat Kasemsuwan, Bangkok (TH); Joseph Light, Singapore (SG); Ai-Tsing Tan, Singapore (SG)

(73) Assignee: National Starch and Chemical Investment Holding Corporation, New Castle, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,318

(22) Filed: Aug. 10, 1999

(51) Int. Cl.[7] .................... A23L 1/0522; C08B 30/12
(52) U.S. Cl. ...................... 127/32; 127/65; 127/71; 426/661
(58) Field of Search ........................ 426/573, 575, 426/576, 578, 604, 661; 127/32, 65, 71

(56) References Cited

U.S. PATENT DOCUMENTS

| | | | | |
|---|---|---|---|---|
| 2,014,798 A | * | 9/1935 | Fuller ........................... | 127/71 |
| 3,446,628 A | | 5/1969 | Schoch et al. ................ | 99/134 |
| 4,073,959 A | | 2/1978 | Durand ........................ | 426/578 |
| 4,192,900 A | | 3/1980 | Cheng ......................... | 426/578 |
| 4,499,116 A | | 2/1985 | Zwiercan et al. ............ | 426/582 |
| 4,567,055 A | | 1/1986 | Moore ........................ | 426/578 |
| 4,726,957 A | | 2/1988 | Lacourse et al. ............ | 426/578 |
| 4,845,152 A | | 7/1989 | Palmer ........................ | 524/734 |
| 4,874,628 A | * | 10/1989 | Eden et al. .................. | 426/578 |
| 4,886,678 A | | 12/1989 | Chiu et al. .................. | 426/578 |

OTHER PUBLICATIONS

Ahmad et al., "Rheological Properties of Sago Starch", J. Agric. Food Chem. 1998, 46, 4060–4065.

Ahmad et al., "Physico–chemical Characterisation of Sago Starch", Carbohydrate Polymers 38 (1999) 361–370.

Govindasamy et al., "Characterization of Changes of Sago Starch Components During Hydrolysis of a Thermostable Alpha–Amylase", Carbohydrate Polymers 0144–8617/92, pp. 89–100.

Sim et al., "Studies on Sago Starch. Part I: Characterization and comparison of Sago Starches Obtained from *Metroxylon sagu* Processed at Different Times", Starch/Stärke 43 Nr. 12, S. 459–466.

Takeda, et al., "Structures and Properties of Sago Starches with Low and High Viscosities on Amylography", J. of Food Science, vol. 54, No. 1, 1989, pp. 177–182.

Wang et al., "Effect of Annealing on the Hydrolysis of Sago Starch Granules", Carbohydrate Polymers, 33, (2/3), 1997, 195–202.

* cited by examiner

*Primary Examiner*—Arthur L. Corbin
(74) *Attorney, Agent, or Firm*—Laurelee Duncan, Esq.; Karen Kaiser, Esq.

(57) ABSTRACT

The present invention is directed to sago fluidity starch and the use thereof. Such fluidity starches exhibit exceptionally fast gelling properties, high gel strengths, and exceptional elasticity. These properties allow for significantly reduced processing times, including reduced hold times. Further, the higher gel strength allows for reduced starch levels without loss of final product gel strength integrity or texture.

8 Claims, 5 Drawing Sheets

SAGO FLUIDITY STARCH AND USE THEREOF

BACKGROUND OF THE INVENTION

The present invention relates to sago fluidity starch and the use thereof, particularly for their gelling properties.

It is known that starch can be used to add texture to products by taking advantage of its gelling properties. For example, jelly gum confections which include such candies as gum drops, jelly beans, and fruit slices, use starch to provide their characteristic resilient, relatively firm gel and short texture.

Typically, such gum confections use a fluidity starch or a combination of a high amylose starch and a fluidity starch which are cooked at a moisture content above the final moisture content of the confectionery, and deposited as a thin, hot liquid into a mold generally formed of dry starch. The starch in the mold forms the confectionery pieces and serves to reduce the moisture content of the confectionery to the level of the end product. This starch mold casting process has the disadvantage of long processing time in order to obtain gel strength integrity sufficient for handling and packaging as well as a desirable product texture.

Surprisingly, it has now been discovered that sago fluidity starches exhibit exceptionally fast gelling properties, unexpectedly high gel strengths, and exceptional elasticity.

SUMMARY OF THE INVENTION

The present invention is directed to sago fluidity starch and the use thereof. Such fluidity starches exhibit exceptionally fast gelling properties, high gel strengths, and exceptional elasticity. These properties allow for significantly reduced processing times, including reduced hold times. Further, the higher gel strength allows for reduced starch levels without loss of final product gel strength integrity or texture.

DETAILED DESCRIPTION OF THE INVENTION

The present invention is directed to sago fluidity starch and the use thereof. Such fluidity starches exhibit exceptionally fast gelling properties, high gel strengths, and exceptional elasticity. These properties allow for significantly reduced processing times, including reduced hold times. Further, the higher gel strength allows for reduced starch levels without loss of final product gel strength integrity or texture.

The base material used for the present invention is native sago starch extracted from the pith of the sago palm tree, including high amylose varieties in which at least 40% of the starch is amylose. The base material may be modified, either chemically or physically, using techniques known in the art. The modification may be to the base or the converted sago starch, though typically the modification is carried out prior to conversion.

Chemically modified starches are intended to include, without limitation, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in *Modified Starches: Properties and Uses,* Ed. Wurzburg, CRC Press, Inc., Florida (1986).

Physically modified starches, such as thermally-inhibited starches described in the family of patents represented by WO 95/04082, may also be suitable for use herein. Physically modified starches is also intended to include fractionated starches in which there is a higher proportion of amylose.

Any starch or starch blends having suitable properties for use herein may be purified, either before or after any modification or conversion, by any method known in the art to remove starch off flavors, odors, or colors that are native to the starch or created during processing. Suitable purification processes for treating starches are disclosed in the family of patents represented by EP 554 818 (Kasica, et al.). Alkali washing techniques are also useful and described in the family of patents represented by U.S. Pat. No. 4,477,480 (Seidel) and U.S. Pat. No. 5,187,272 (Bertalan et al.).

Sago conversion products, including fluidity or thin-boiling starches prepared by oxidative hydrolysis, acid hydrolysis, enzyme conversion, heat and/or acid dextrinization, or a combination thereof, are suitable for use herein as are products made from blends thereof. Particularly suitable conversion products are those prepared by oxidation or acid conversion.

In commercial practice, starch is ordinarily converted by acid or enzyme conversion techniques. One developed process for degradation of granular starch involves a process employing hydrogen peroxide and a manganese salt catalyst such as potassium permanganate in alkaline slurry (manox conversion).

In preparation of converted starches by acid treatment, the granular starch base is hydrolyzed to the required viscosity in the presence of an acid, such as sulfuric or hydrochloric acid, at a temperature below the gelatinization point of the starch. The starch is slurried in water and the acid, usually in concentrated form, is then added. Typically, the reaction takes place over an 8 to 16 hour period, after which the acid is neutralized with alkali (e.g., to a pH of 5.5) and the starch recovered by filtration.

The converted starch is prepared by enzyme treatment as known in the art. For example, the granular starch base may be slurried in water and the pH adjusted to about 5.6 to 5.7 with alkali or acid. A small amount of alpha-amylase enzyme (e.g., about 0.02% on the starch) is then added to the slurry, which is heated above the gelatinization point of the starch. When the desired conversion is reached, the pH is adjusted with acid (e.g., to about 2.0) to deactivate the enzyme and the dispersion is held at the pH for a period of at least 10 minutes. Thereafter the pH may be readjusted. The resulting converted starch is usually jet-cooked to ensure complete solubilization of the starch and deactivation of the residual enzyme. The type and concentration of the enzyme, the conversion conditions, and the length of conversion all will contribute to the composition of the resultant product. In the alternative, another enzyme or a combination of enzymes may be used.

Hydrogen peroxide may also be used on the starch as a converting (thinning) agent, either alone or together with metal catalysts. U.S. Pat. No. 3,655,644 issued on Apr. 11, 1972 to H. Durand, discloses a method of thinning derivatized starch using hydrogen peroxide and a copper ion catalyst. U.S. Pat. No. 3,975,206 issued Aug. 17, 1976 to J. Lotzgesell et al., discloses an improved method for thinning starch employing hydrogen peroxide in combination with heavy metal salt catalysts such as iron, cobalt, copper or chromium, at an acid pH. This patent further lists a number of references directed to degrading (thinning) starch with hydrogen peroxide under a variety of conditions. Another more recent patent, U.S. Pat. No. 4,838,944 issued Jun. 13, 1989 to L. Kruger, discloses a process for the degradation of granular starch using hydrogen peroxide and a catalytic amount of manganese salt, preferably potassium permanganate, in an aqueous slurry at a pH of 11.0 to 12.5. Even more recently, U.S. Pat. No. 5,833,755 issued Nov. 10, 1998 to Schlom, et al., disclosed a process for degrading granular starch with hydrogen peroxide at a temperature below the gelatinization temperature of the starch, the steps comprising providing an aqueous slurry of granular starch at a pH of 11.0 to 12.5, adding an effective catalytic amount of a metal complex catalyst to the aqueous slurry, adding said hydrogen peroxide to the aqueous slurry in an effective amount to degrade the granular starch.

Suitable sago starch is converted to a water fluidity (WF) of from about 40–80, particularly from about 45–75, more particularly from about 55–65. Water fluidity, as used herein, is an empirical test of viscosity measured on a scale of 0–90 wherein fluidity is inversely proportional of viscosity. Water fluidity of starches is typically measured using a Thomas Rotational Shear-type Viscometer (commercially available from Arthur A. Thomas CO., Philadelphia, Pa.), standardized at 30° C. with a standard oil having a viscosity of 24.73 cps, which oil requires 23.12±0.05 sec for 100 revolutions. Accurate and reproducible measurements of water fluidity are obtained by determining the time which elapses for 100 revolutions at different solids levels depending on the starch's degree of conversion: as conversion increases, the viscosity decreases and the WF values increase.

The resultant sago fluidity starches may be pregelatinized by techniques known in the art including drum drying, spray drying, or jet cooking. Exemplary processes for preparing pregelatinized starches are disclosed in U.S. Pat. Nos. 1,516,512; 1,901,109; 2,314,459; 2,582,198; 2,805,966; 2,919,214; 2,940,876; 3,086,890; 3,133,836; 3,137,592; 3,234,046; 3,607,394; 3,630,775; 4,280,851; 4,465,702; 5,037,929; 5,131,953, and 5,149,799, the disclosures of which are hereby incorporated by reference.

The resultant sago fluidity starch has a higher gelation temperature, typically from about 5 to about 7° C., than comparable WF fluidity starches prepared from other bases such as corn. Gelation temperature, as used herein, is the temperature at which the starch, after cooking, begins to gel upon cooling. Such higher gelation temperatures provide a faster gelling rate to products. This is advantageous in that the starch does not need to cool to as low a temperature before the product has gelled, thus reducing processing times. For example, the hot-hold times that lead up to dispensing of the starch syrup into the candy molds and the hold times in the candy molds may be reduced for starch gum candies by replacing a corn fluidity starch with a comparable WF sago fluidity starch.

The resultant sago fluidity starch forms gels that are exceptionally strong, typically about 100% stronger, more particularly 200%, most particularly 250% stronger, than comparable WF fluidity starches prepared from other bases such as corn. This increased gel strength may allow reduced starch levels in products while still achieving the desired gel strength and texture. For example, to provide a comparable gel strength and texture, generally at least 30% more, particularly at least 50% more, more particularly at least 100% more of a comparable WF corn starch would need to be used.

The sago fluidity starch gels tend to be elastic in nature, as opposed to cuttable. For example, a sago fluidity starch gel is more elastic than a corn fluidity starch gel of the same gel strength. This elastic nature is desirable in many end use applications, such as in confectionery products where the elasticity provides springiness and chew.

The resultant sago fluidity starches generally have good water holding properties in that syneresis is limited. The starches are generally comparable to tapioca fluidity starches with respect to low pH, shear, and temperature tolerance.

Sago fluidity starches may also be used to replace gelatin, casein, pectin, agar, gum arabic, isolated soy or meat proteins, and certain gelling gums such as carrageenan.

The resultant sago fluidity starches are useful in a variety of industrial applications including food products, personal care products, pharmaceuticals and nutraceuticals, papermaking, agricultural products, and paints, particularly in those applications where low-viscosity starches are needed to provide a high-solids starch dispersion with a pumpable and workable viscosity. Industrial applications in which degraded or converted starches are particularly desirable or required include paper and paper board manufacture, the manufacture of gypsum board for dry wall construction, and textile warp sizing.

Food products is intended to include both foods and beverages, including but not limited to, confectioneries such as starch gum candies, noodles, puddings, custards, and flans, fillings such as pie fillings, imitation cheese and cheese products, spreads such as margarines, toppings, icings, imitation fish, poultry or meat, starch balls, yogurts, gelled desserts, jellies, and egg products.

The sago fluidity starch may be used in any amount necessary to achieve the characteristics desired for the particular end use application. In general, the starch is used in an amount of at least about 1%, particularly at least about 2.5%, more particularly at least about 5%, by weight of the product. In general, the starch is used in an amount of no more than about 95%, particularly no more than about 90%, more particularly no more than about 80%, by weight of the product.

EXAMPLES

The following examples are presented to further illustrate and explain the present invention and should not be taken as limiting in any regard. All percents used are on a weight/weight basis.

The following tests were used throughout the examples:

Water Fluidity

Water fluidity was measured using a Thomas Rotational Shear-Type Viscometer (commercially available by Arthur H. Thomas, Co., Philadelphia, Pa., USA), standardized at 30° C. with a standard oil having a viscosity of 24.73 cps., which oil requires 23.12.+/−0.05 sec. for 100 revolutions. Accurate and reproducible measurements of the water fluidity were obtained by determining the time which elapsed for 100 revolutions at different solids levels depending on the starch's degree of conversion (as conversion increases, the viscosity decreases). The procedure used involved slurrying the required amount of starch (e.g., 6.16 g. dry basis) in 100 ml. of distilled water in a covered copper cup and heating the slurry in a boiling water bath for 30 min. with occasional stirring. The starch dispersion was then brought to the final weight (e.g. 107 g.) with distilled water. The time required for 100 revolutions of the resultant dispersion at 81–83° C. was recorded and converted to a water fluidity number as defined in the table below.

| Amount of Starch Used (anhydrous, g.) | | | | |
|---|---|---|---|---|
| 6.16[a] | 8.80[b] | 11.44[c] | 13.20[d] | |
| Time required for 100 revolutions (sec.) | | | | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.5 | 75 |
| | | | 11.5 | 80 |
| | | | 10.0 | 85 |
| | | | 9.0 | 90 |

[a,b,c,] and [d]Final weight of starch solutions are 107, 110, 113, and 115 g., respectively.

Gel Strength Using a Texture Analyzer

Gel strength was measured using a texture analyzer model TA-XT2, commercially available from Texture Analyser. Twenty grams of anhydrous starch were mixed with deionized water to obtain the desired percent solids starch slurry. The slurry was cooked in a boiling water bath for twenty minutes, stirring to keep the starch suspended until thickened, then covered without stirring. The cooked starch was poured into tubes, covered and allowed to cool to room temperature overnight to obtain gels which had a height of about 16mm and a diameter of about 25 mm.

The starch gel was removed from the tube. The height and diameter of the gel were measured and entered into the texture analyzer. Two drops of silicon oil and then the gel were placed on the texture analyzer testing plate. Two additional drops of silicon oil were placed on top of the gel and the test was run using the following parameters.
Mode: Force/Compression
Option: Return to start
Pre-speed: 5.0 mm/sec
Speed: 0.8 mm/sec
Post-speed: 5.0 mm/sec
Force: N/A
Distance: 10.0 mm
Time: N/A
Count: N/A
Trigger: 0.05N PPS: 200.00
Probe: P50 50 mm diameter, Cylinder Aluminum Viscosity Using a Brabender Viscosity was measured using a commercially available Brabender viscoamylograph, model VA-1B. 97.4 g anhydrous starch are mixed with distilled water sufficient to obtain 487 g slurry, and added to the Brabender viscoamylograph bowl. The slurry is heated from room temperature to 92° C. at a rate of about 4° C./minute and held at 92° C. for forty minutes. The dispersion is then cooled to 25° C. at a rate of 1.5° C./minute.

Potassium Iodine Test

Residual oxidizing substances in the starch slurry was measured using the potassium iodine test. If there are any residual oxidants present in the slurry, iodine is liberated from the potassium iodide. The resulting color formed is in proportion to the level of the oxidizing substances present in the slurry.

Five drops of the starch slurry is placed in a ceramic spot test tray. Five drops of a 3:1 hydrochloric acid:water solution is added to the slurry and mixed well. Three drops of a saturated potassium iodide solution is added to this acidified starch slurry, mixed, and allowed to stand for five minutes. The color of the mixture is noted. If the color remains white/off-white, the test is negative. If the color turns brown, blue or purple, the test is positive.

Example 1

Preparation of a Sago Fluidity Starch By Acid Conversion 500 grams native sago starch were slurried in 750 mls water and placed in a hot water bath with constant agitation. The temperature was brought up to and maintained at about 50° C. 2.0 grams hydrochloric acid (0.4% by weight of the starch) were added with mixing. After 16 hours, the pH was adjusted to 5.5 with a caustic solution. The starch was filtered, washed, and dried. The resultant sago starch had a WF of 43.

The above procedure was repeated using different amounts of HCl to obtain fluidity sago starches with different water fluidities.

Example 2

Preparation of Sago Fluidity Starch By Manox Conversion 1000 g. of native sago starch was slurried in 1500 mls water. 0.8% (based on the starch) NaOH as 3% solution was slowly added to the slurry and then 0.005%(based on the starch) $KMnO_4$ as 2% solution was added. After mixing for 15 minutes, 2.0% (based on the starch) of hydrogen peroxide, 30% assay, was added. The reaction was held at 40° C. for about three hours until negative KI test, while maintaining a pH of greater than 11. After the reaction was over, the slurry was neutralized to pH=5.5 with 3:1 water:HCl, filtered, washed and air dried. The sample had a WF of 63.

Example 3

Gelling Properties of Sago Fluidity Starches

A 12% (w/w) slurry of the starch prepared in Example 1 was prepared using distilled water. The slurry was cooked by placing it in a boiling water bath for twenty minutes. The slurry was poured into tubes and allowed to sit for twenty-four hours. The procedure was repeated for the starches of various WFs. The procedure was also repeated with fluidity tapioca, corn, and wheat starches prepared using the procedure of example 1 in which different bases and amounts of acid were used. The gelled starch cooks were subjectively evaluated and the results are shown below.

| Base/WF | Gel/Set Properties | Clarity/Texture |
| --- | --- | --- |
| Sago/0 | Medium set | Very slightly cloudy/Elastic, cohesive |
| Sago/17 | Very soft gel | Slightly cloudy/Elastic, cohesive |
| Sago/33 | Soft gel | Moderately cloudy/Elastic |
| Sago/43 | Soft-medium gel | Very cloudy/Elastic, slightly brittle |
| Sago/54 | Medium gel, strong | Opaque/Brittle |
| Sago/67 | Very firm gel, strong | Opaque/Very brittle, firm |
| Sago/74 | Medium gel, strong | Opaque/Brittle |
| Tapioca/65 | Soft-medium gel | Opaque/Firm |
| Corn/65 | Soft gel | Opaque/Brittle |
| Wheat/65 | Soft gel | Opaque/Firm |
| Potato/65 | Very soft gel | Opaque/Firm |

Notes: The subjective gelling and gel hardness were evaluated by applying pressure to the surface of the gel. The texture was evaluated by cutting through the gel with a rod and stirring to determine how the cook came apart. A set, as used herein, has a less firm structure than a gel.

Example 4

Gelling Properties of Sago Fluidity Starches

A 5% (w/w) slurry of the starch prepared in Example 1 was prepared using distilled water. The slurry was cooked by placing it in a boiling water bath for twenty minutes. The slurry was poured into tubes and allowed to sit for twenty-four hours. The procedure was repeated for the starches of various WFs. The procedure was also repeated with fluidity tapioca, corn, potato, and wheat starches prepared using the procedure of example 1 in which different bases and amounts of acid were used. The gelled starch cooks were subjectively evaluated and the results are shown below.

| Base Starch | WF Range | | | |
| --- | --- | --- | --- | --- |
| | 40–50 | 50–60 | 60–70 | 70–80 |
| Sago | Very soft gel | Very soft to soft gel | Soft to very soft gel | Liquid-like to water |
| Corn | N/A | N/A | Liquid-like | Watery |
| Potato | Soft set | Soft set | Liquid-like | Liquid to watery |
| Tapioca | Soft set | Liquid-like | Liquid-like to watery | Watery |

Notes: The gelling properties were subjectively evaluated by applying pressure to the surface of the gel. The texture was evaluated by cutting through the gel with a rod and stirring to determine how the cook came apart. A set, as used herein, has a less firm structure than a gel.

Example 5

Gel Strength of Various Starch Bases and Water Fluidities

Figure 1:
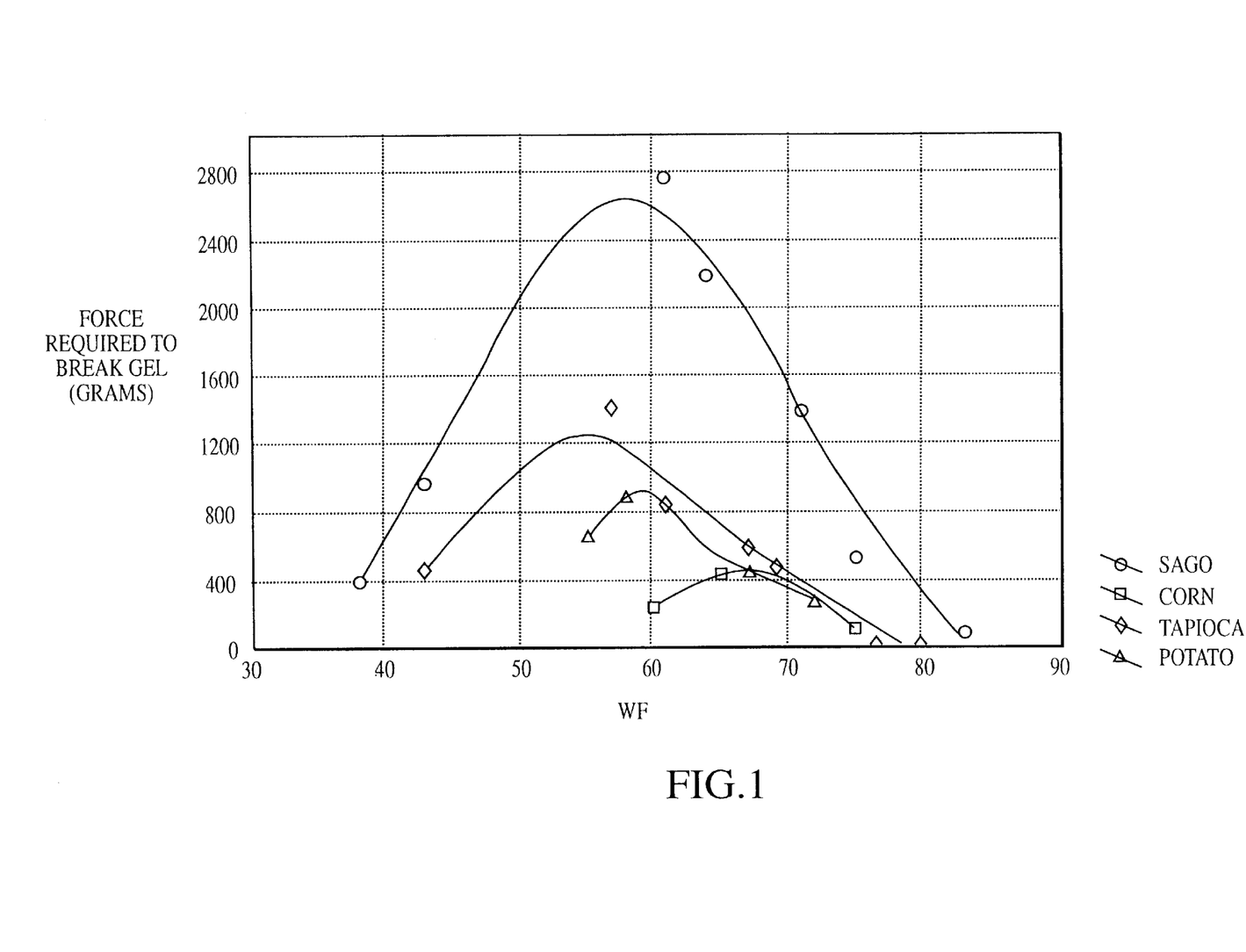
FIG. 1 depicts the gel strength of sago, corn, tapioca and potato starches at 10% solids and varying water fluidities.
Figure 2:
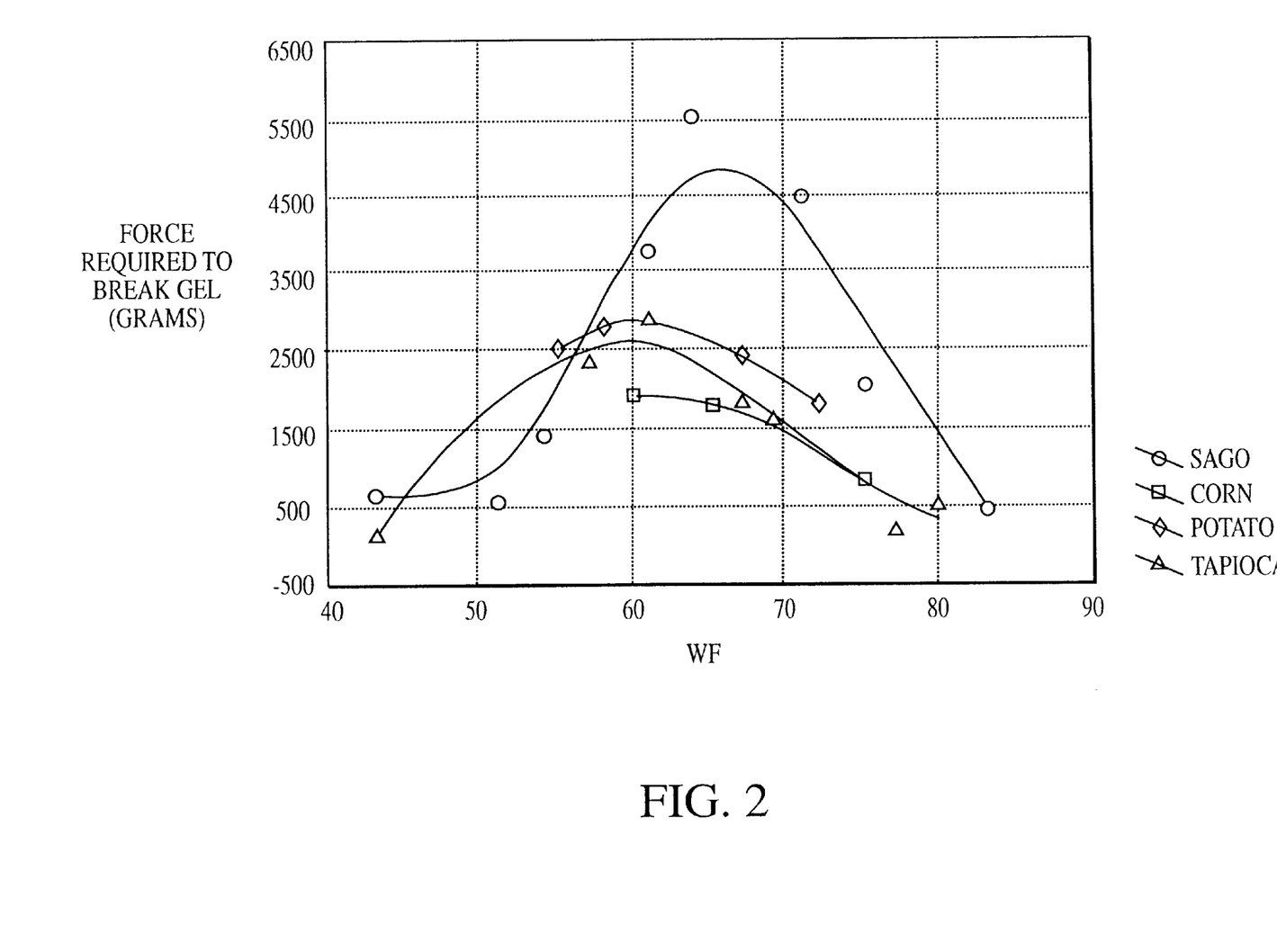
FIG. 2 depicts the gel strength of sago, corn, tapioca and potato starches at 15% solids and varying water fluidities.

Fluidity starches of varying water fluidities were prepared using the procedure of example 1 with sago, corn, tapioca and potato bases and varying the amount of HCl used for conversion. The gel strength of these starches was tested using a texture analyzer. FIG. 1 shows the gel strength at 10% solids. FIG. 2 shows the gel strength at 15% solids.

As can be seen from FIGS. 1 and 2, the peak force required to break the sago fluidity starch gels is significantly stronger than those using other bases.

Example 6

Viscosity of Sago Fluidities During Cooling

Figure 3:
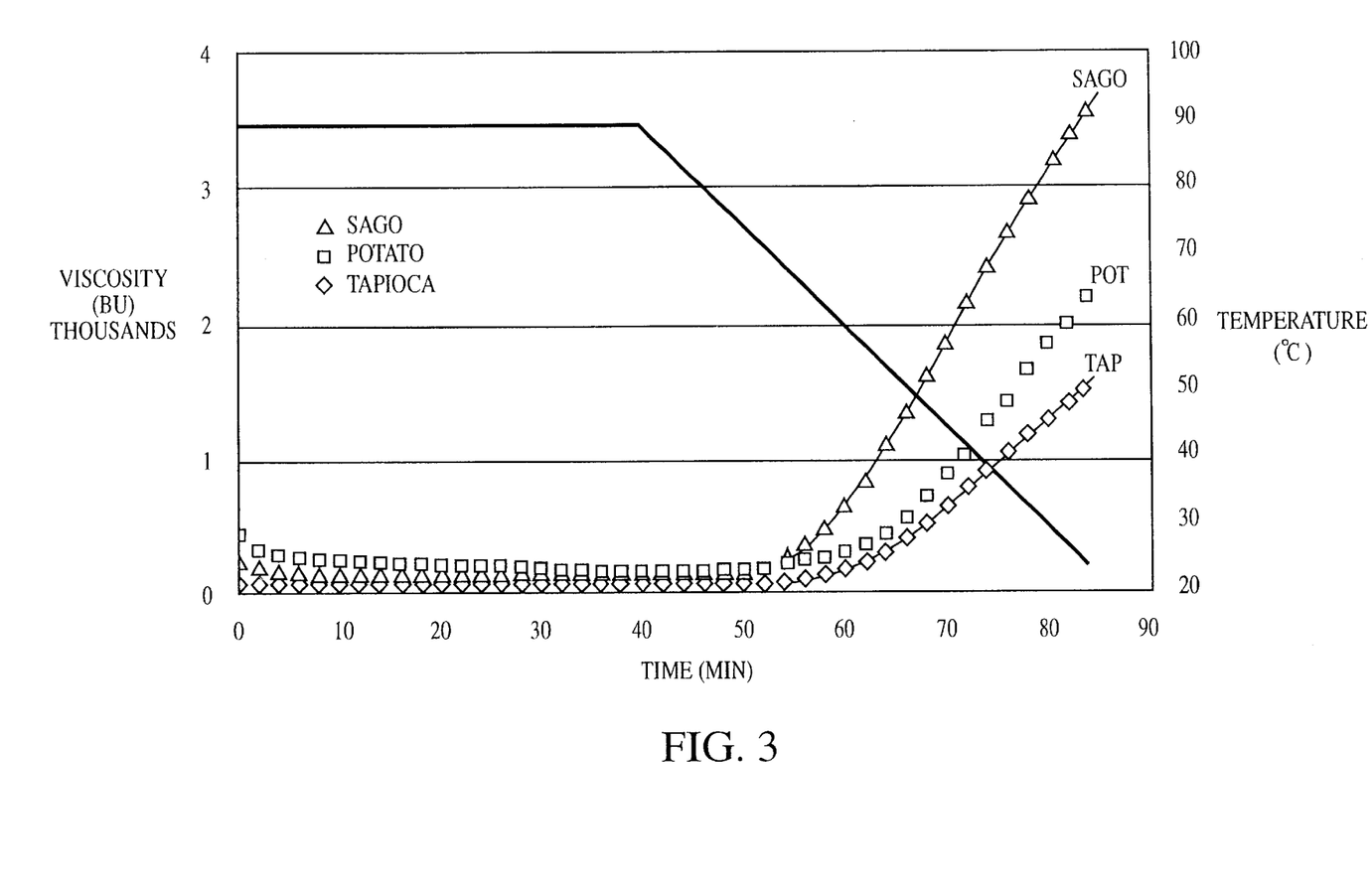
FIG. 3 depicts the viscosity upon cooling of sago, tapioca and potato fluidity starches at a WF of about 45.
Figure 4:
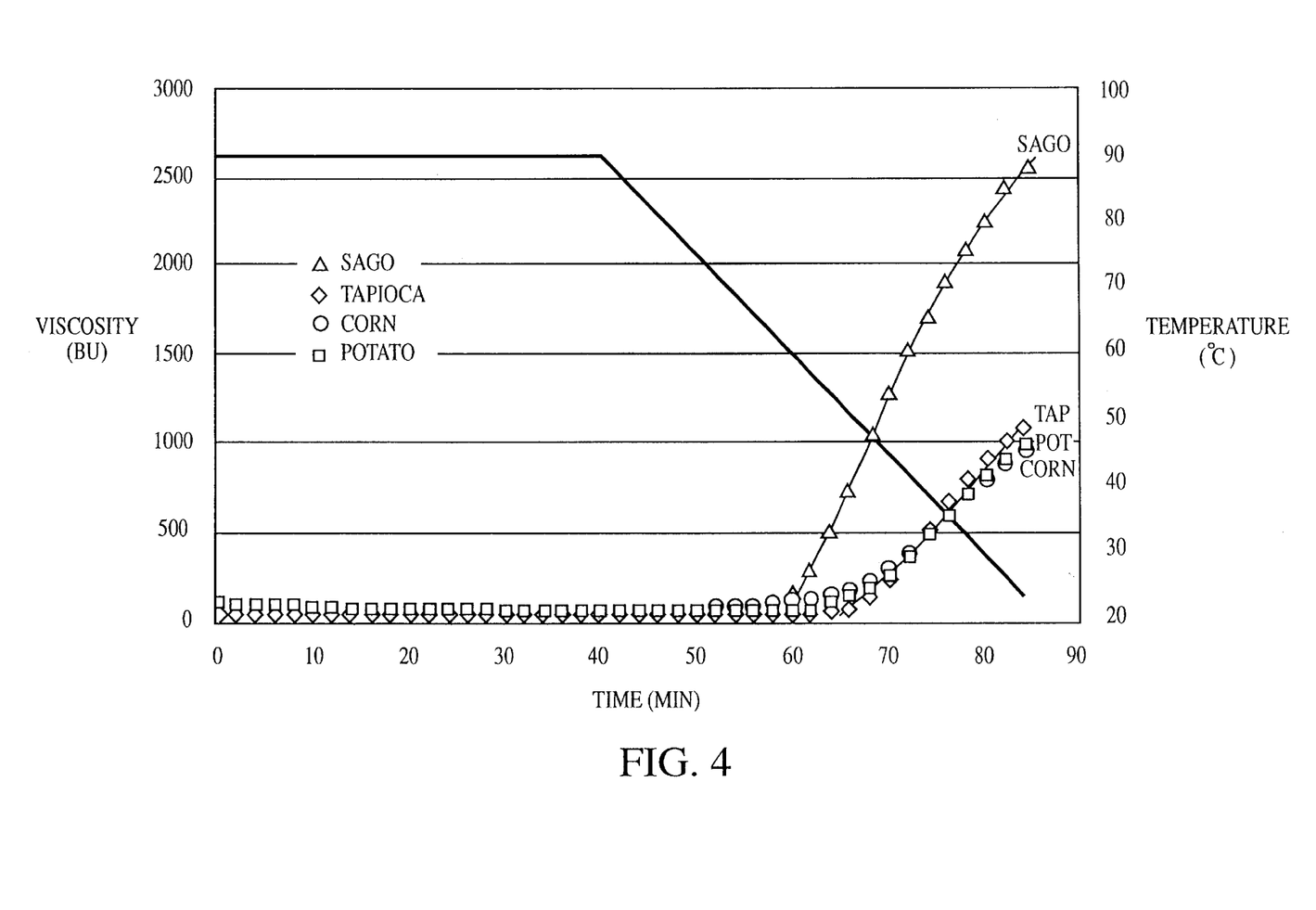
FIG. 4 depicts the viscosity upon cooling of sago, corn, tapioca and potato fluidity starches at a WF of about 65.
Figure 5:
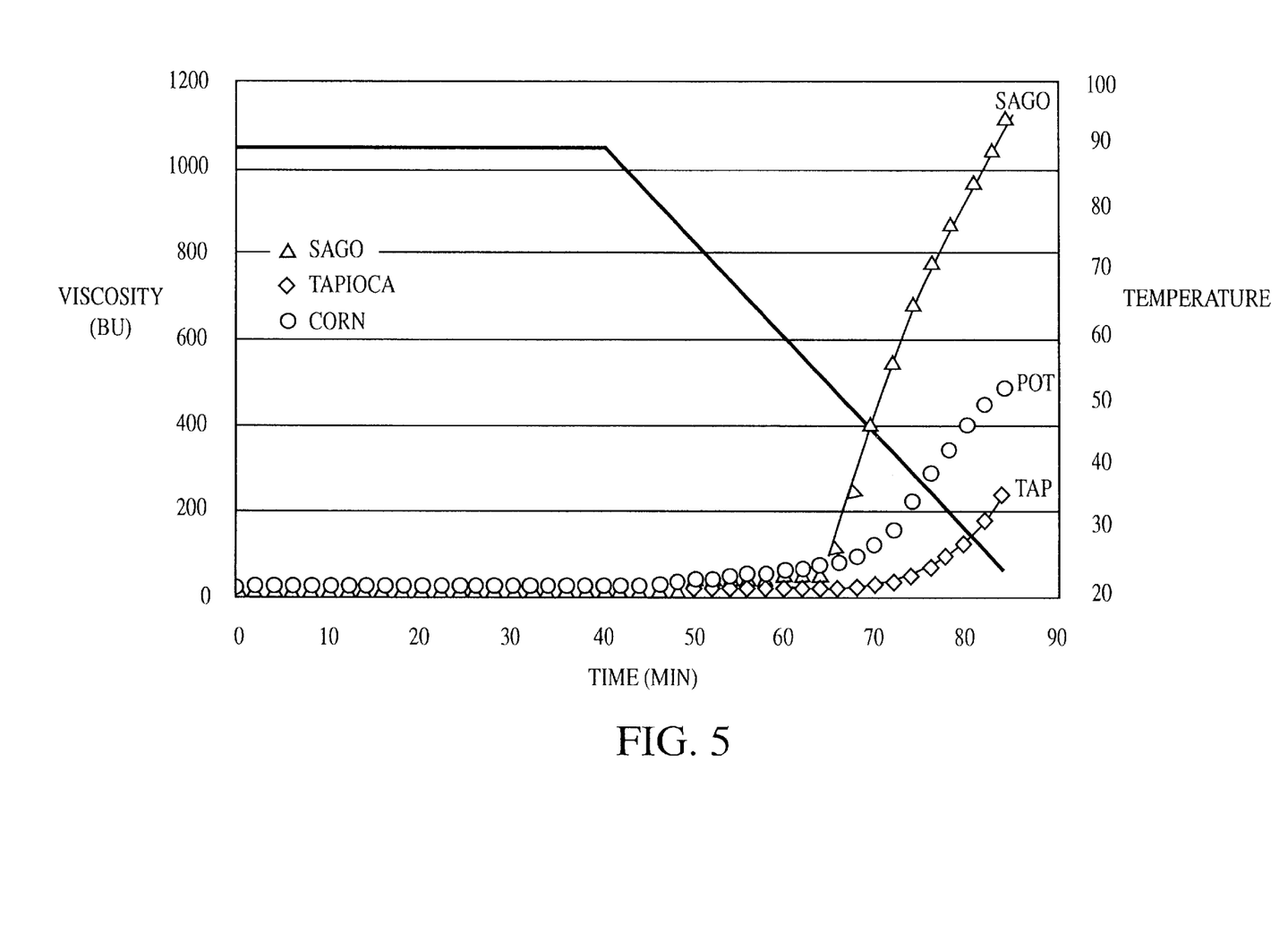
FIG. 5 depicts the viscosity upon cooling of sago, corn, tapioca and potato fluidity starches at a WF of about 75.

Fluidity starches of varying water fluidities were prepared using the procedure of example 1 with sago, corn, tapioca and potato bases and varying the amount of HCl used for conversion. The viscosity of these starches was tested using a Brabender. FIG. 3 shows the viscosity at a WF of about 45. FIG. 4 shows the viscosity at a WF of about 65. FIG. 5 shows the viscosity at a WF of about 75.

As can be seen from FIGS. 3, 4, and 5, the sago fluidity starch develops a viscosity at a high temperature, indicating more rapid gel formation.

NOTE: In Examples 7–20, the sago fluidity starches were prepared using the methodology of Example 1, but varying the WF as specified.

Example 7

Preparation of Starch Balls

Starch balls were prepared using the following ingredients.

| | Ingredients | Amount (g) |
| --- | --- | --- |
| A. | Sago fluidity starch, 60 WF | 45.000 |
| | Sodium alginate | 0.273 |
| | Carrageenan | 0.182 |
| B. | Water | 54.545 |
| | The following solutions were prepared: solution of calcium chloride - Solution D; solution of sodium carbonate - Solution E; solution of citric acid - Solution F; and sugar solution - Solution G. | |

The A ingredients were dry blended thoroughly. The B ingredients were gradually added to the A mixture while stirring continuously, to form slurry C. Using a dropper, slurry C was dropped into solution D to form the starch balls, adjusting the drop height to remove any tailing of the starch balls. The starch balls were removed and placed into boiling solution E. After boiling, the balls were removed and immediately placed into solution F. After soaking, the balls were removed and washed to remove the remaining citric acid present on the balls. The balls were then rinsed in water several times. Starch balls were filled into a can together with solution G and seamed. The can was retorted at 120° C. for 20 minutes.

The resulting starch balls were opaque and off-white. They had a smooth appearance with soft and brittle gel structure.

Example 8

Preparation of Fish Balls

Fish balls were prepared using the following ingredients.

| Ingredients | Amount (g) |
| --- | --- |
| Fresh fish meat | 66.50 |
| Ice water | 25.29 |
| Sago fluidity starch, 60 WF | 5.00 |
| Salt | 2.80 |
| Monosodium glutamate | 0.28 |
| Sodium polyphosphate | 0.13 |

The fish meat was blended. Gradually, the salt was added and thoroughly mixed. Ice water was then added, followed by sodium polyphosphate. After thorough mixing at a temperature of below 10° C., the remaining dry ingredients were added to the mix, ensuring even distribution.

Fish balls were formed from this mixture and placed in water of 35–40° C. The balls were cooked for in boiling water. After cooking, the fish balls were chilled immediately.

The resulting fish balls were off-white, moderately firm and elastic.

Example 9

Preparation of Milk Custard

Milk custard was prepared using the following ingredients.

| Ingredients | Amount (g) |
| --- | --- |
| Whole milk | 85.955 |
| Sugar | 8.000 |
| Sago fluidity starch, 60 WF | 6.000 |
| Vanilla flavor | 0.040 |
| Yellow color | 0.005 |

The dry ingredients were blended and added to the milk, mixing until homogeneous. The mixture was heated to 95° C. and held for 5 minutes with constant stirring. The mixture was then filled into containers and rapidly cooled to room temperature.

The resulting milk custard was opaque and yellowish-white in color. It had a moderately firm and slightly brittle gel structure.

Example 10

Preparation of Red Bean Pudding

Red bean pudding was prepared using the following ingredients.

| Ingredients | Amount(g) |
| --- | --- |
| Sugar | 18.00 |
| Sago fluidity starch, 60 WF | 5.00 |
| Salt | 0.18 |
| Red Bean Extract[1] | 76.82 |

[1] A red bean extract was first prepared. The red beans were washed and added to water to obtain a bean:water ratio of 1:5 parts (wt/wt) and boiled for two hours. The beans were ground to small particulates that were noticeable in the extract. The extract was allowed to cool to room temperature.

The dry ingredients were blended thoroughly and added to the bean extract. The mixture was heated to 95° C. and held for 5 minutes with constant stirring. The mixture was filled into containers and rapidly cooled to room temperature.

The resulting red bean pudding was firm and formed a brittle gel structure.

Example 11

Grass Jelly

Grass jelly was prepared using the following ingredients.

| Ingredients | Amount (g) A | B |
| --- | --- | --- |
| Herb extract | 73.91 | 73.91 |
| Water | 14.89 | 13.39 |
| Sugar | 8.70 | 8.70 |
| Sago fluidity starch, 60 WF | 2.50 | 4.00 |

The starch was slurried with the water. Sugar was added to the herbal extract and heated to 80° C. with continuous stirring. The starch slurry was poured into the hot extract, heated to 95° C., and held for 5 minutes. The mixture was brought back to weight with hot water, poured into a plastic container, and allowed to set overnight at 4° C.

The resulting grass jellies had grainy surfaces and imparted moderately firm gel structures. The grass jelly using 4.0% starch gave a firmer and slightly more brittle gel than the 2.5% starch grass jelly.

Example 12

Preparation of Chicken Frankfurters

Chicken frankfurters were prepared using the following ingredients.

| | Ingredients | Amount (g) |
| --- | --- | --- |
| A. | Chicken thigh/leg | 45.00 |
| | Ice water | 13.88 |
| | Sago fluidity starch, 60 WF | 7.07 |
| | Salt | 1.34 |
| | Sodium polyphosphate | 0.35 |
| | Sodium nitrite | 0.01 |
| | Pepper | 0.47 |
| | Frankfurter flavor | 0.19 |
| | Smoke flavor | 0.19 |
| B. | Chicken fat | 19.55 |
| | Water | 9.80 |
| | Sago fluidity starch, 60 WF | 1.075 |
| | Isolated soya protein | 1.075 |

The chicken fat was chopped with isolated soy protein and the water was added. The temperature was maintained below 10° C. The resulting emulsion was set aside to cool.

The chicken thigh/leg was chopped with starch and gradually salt was added followed by sodium polyphosphate. Then, the ice water, sodium nitrite and flavor were added. The temperature was maintained below 10° C. and the mixture was chopped.

The two mixtures were then chopped together for 3 minutes and stuffed into casings to form frankfurters. The frankfurters were boiled at 80° C.

The resulting chicken frankfurters had a relatively firm and slightly brittle texture.

Example 13

Preparation of Confectionery

A confectionery was prepared using the following ingredients.

| Ingredients | Amount (g) |
| --- | --- |
| Sago fluidity starch, 60 WF | 18.00 |
| Water | 82.00 |

The starch was slurried in the water, heated to 95° C., and held for 5 minutes with constant stirring. The resulting paste was cooled and molded into balls which were dropped into water to cool.

The resulting confectionery was cuttable, brittle, and very firm.

Example 14

Preparation of Instant Noodles

Instant noodles were prepared using the following ingredients.

| Ingredients | Amount (g) |
| --- | --- |
| Wheat flour | 68.00 |
| Sago fluidity starch, 60 WF | 5.00 |
| Salt | 0.80 |
| Kansui powder[1] | 0.20 |
| Water | 26.00 |

[1]Kansui powder is a mixture of sodium carbonate, potassium carbonate, and sodium polyphosphate.

The flour and starch were mixed at low speed. The kansui powder and salt were dissolved in water, added to the flour mixture, and mixed at low speed. The mixing speed was increased to medium and mixed. The crumbly mixture was sheeted and cut into noodles. The noodles were steamed, cut into portions, and folded. Then the noodles were fried in oil at 150° C. After frying, the noodle cakes were allowed to cool before packing.

The resulting instant noodles were crispy. Upon boiling, the noodles had a smooth appearance, were soft and had a fairly elastic texture.

Example 15

Preparation of Yogurt

Yogurt was prepared using the following ingredients.

| Ingredients | Amount (g) |
| --- | --- |
| Whole milk powder | 8.00 |
| Skim milk powder | 1.00 |
| Sugar | 3.70 |
| Sago fluidity starch, 60 WF | 1.00 |
| Water | 86.30 |
| Yogurt Culture[1] | |

All ingredients, except the yogurt culture, were mixed together. The mixture was heated to 75° C. with constant stirring and homogenized at 2500 psi (single pass) using the single stage Rannie High Pressure Laboratory Homogenizer. The mixture was heated to 95° C. and held for 5 minutes. The mixture was immediately cooled to 43° C., inoculated with the yogurt culture, deposited into containers, and incubated at 43° C. until pH=4.3. The yogurt was then chilled to 10° C.

The resulting yogurt had a smooth appearance and soft-set texture.

Example 16

Preparation of Konjac Flour Product

A konjac flour product was prepared using the following ingredients.

| Ingredients | Amount (g) |
| --- | --- |
| Konjac flour[1] | 7.40 |
| SAGO FLUIDITY STARCH, 60 WF | 3.70 |
| Sodium carbonate | 0.70 |
| Water | 88.20 |

The starch and water were heated to 95° C. and held for 5 minutes with constant stirring. The paste was cooled to 25° C. The paste was mixed for 20 minutes while the konjac powder was gradually added. The sodium carbonate was added and mixed for another three minutes. The mixture was placed into molds and steamed for 40 minutes. The steamed gel was removed from the molds and boiled in 100° C. water for 3 minutes. The water was changed and the gel was boiled for an additional 40 minutes. The gel was allowed to cool.

The resulting konjac flour product had a very firm gel and a slightly elastic texture.

Example 17

Preparation of Fruit Flan

A fruit flan was prepared using the following ingredients.

| Ingredients | Amount (g) |
| --- | --- |
| Sago fluidity starch, 60 WF | 5.00 |
| Pineapple rings in heavy syrup[1] | 47.50 |
| Water | 47.50 |

[1]Commercially available from Del Monte

Pineapple rings were placed in a metal dish. Starch, water and the pineapple syrup were heated to 95° C. and held for 5 minutes. The mixture was cooled to room temperature and poured into the dish, covering the pineapples. The resulting flan was chilled at 5° C. overnight.

The resulting fruit flan was opaque white. It formed a soft and brittle gel.

Example 18

Preparation of Egg Cake

An egg cake was prepared using the following ingredients.

| Ingredients | Amount (g) |
| --- | --- |
| Sago fluidity starch, 60 WF | 27.28 |
| Whole eggs | 36.36 |
| Soup stock liquid[1] | 36.36 |

[1] Soup stock liquid is a mixture of Bonito-flavored soup stock (0.30%), salt (1.10%), sugar (12.10%), soy Sauce (5.50%), and water (90.97%).

All ingredients were mixed together thoroughly. The mixture was spread onto a heated pan, cooked, and rolled.  The steps may be repeated several times from  to  to make a larger egg cake roll. The egg cake was allowed to cool.

The resultant egg cake had a firm texture.

Example 19

Preparation of a Kettle-Cooked Gelatin Candy

Kettle-cooked gelatin candy was prepared using the following ingredients.

| | Ingredients | Amount (g) |
| --- | --- | --- |
| A. | Sugar | 40.00 |
| | Glucose syrup (42 DE) | 32.00 |
| | Sago fluidity starch, 60 WF | 3.00 |
| | Water | 7.00 |
| B. | Gelatin (200 bloom) | 5.00 |
| | Water | 13.00 |
| | Citric acid | As desired |
| | Flavor | As desired |

The B ingredients were mixed and the gelatin was allowed to hydrate. The glucose syrup was heated in a water bath to 65° C. The starch and water (in A) were slurried and cooked. The heated glucose was added, then the sugar was added. The mixture was cooked to a soluble solids content of 85° Brix. The mixture was cooled and the hydrated gelatin mixture was added. When the soluble solids reached 79° Brix, the candy mixture was poured into a non-stick pan and the candy was heated until 83° Brix was reached. The candy was then demolded, cut, and sugar-sanded.

The resultant gelatin candy had an elastic and firm texture.

Example 20

Preparation of a Kettle-Cooked Gum Drop

Kettle-cooked gum drops were prepared using the following ingredients.

| Ingredients | Amount (g) |
| --- | --- |
| Glucose syrup (42 DE) | 36.00 |
| Sugar | 30.00 |
| Sago fluidity starch, 60 WF | 11.00 |
| Dextrose | 11.00 |
| Water | 12.00 |
| Citric acid | As desired |
| Flavor | As desired |

The glucose syrup was warmed in a boiling water bath. The starch was slurried in the water and cooked. The warmed glucose syrup, sugar, and dextrose were mixed into the starch slurry and cooked until the soluble solids was between 78 and 79° Brix. The flavor, color, and citric acid were added. The candy mixture was then deposited into starch molds and heated to a final solids of 82–84%.

The resultant gum drop had a firm and cuttable texture.

We claim:

1. A sago starch having a water fluidity (WF) of from about 40 to about 80 and having a gel strength at least 100 greater than a comparable corn starch having a WF of from about 40 to about 80 when both the sago starch and the corn starch are evaluated for gel strength at a 10% solids content.

2. The sago starch of claim 1 having a water fluidity of from about 45 to about 75.

3. The sago starch of claim 1 having water fluidity of from about 55 to about 65.

4. The sago starch of claim 1, wherein said starch is pregelatinized.

5. The sago starch of claim 1 having a gelation temperature from about 5 to about 7° C. higher than a comparable corn starch.

6. The sago starch of claim 1 having a gel strength which is about 100% greater than a comparable corn starch.

7. The sago starch of claim 1 having a gel strength which is about 200% greater than a comparable corn starch.

8. The sago starch of claim 1 having a gel strength which is about 250% greater than a comparable corn starch.

* * * * *